(12) United States Patent
Yano et al.

(10) Patent No.: US 11,378,343 B2
(45) Date of Patent: Jul. 5, 2022

(54) HEAT TREATMENT DEVICE

(71) Applicant: IHI CORPORATION, Tokyo (JP)

(72) Inventors: Akihisa Yano, Tokyo (JP); Tatsuya Oka, Tokyo (JP); Takahito Akita, Tokyo (JP); Taiga Yamamoto, Tokyo (JP); Hideshi Shibuya, Tokyo (JP); Yusuke Takeuchi, Tokyo (JP); Hiroyuki Kamata, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 16/580,924

(22) Filed: Sep. 24, 2019

(65) Prior Publication Data

US 2020/0018553 A1 Jan. 16, 2020

Related U.S. Application Data

(63) Continuation of application No. PCT/JP2018/013096, filed on Mar. 29, 2018.

(30) Foreign Application Priority Data

Mar. 31, 2017 (JP) .............................. JP2017-072206

(51) Int. Cl.
*F28F 1/00* (2006.01)
*F28D 9/00* (2006.01)
(Continued)

(52) U.S. Cl.
CPC .......... *F28D 9/0093* (2013.01); *F28D 20/003* (2013.01); *F28F 3/10* (2013.01); *F28F 9/26* (2013.01); *F28D 2021/0022* (2013.01)

(58) Field of Classification Search
CPC ...... F28F 1/003; F28D 9/0031; F28D 9/0037; F28D 9/0081; F28D 9/0093; F28D 20/003
(Continued)

(56) References Cited

U.S. PATENT DOCUMENTS 3,825,061 A * 7/1974 Bathla ...................... F28F 11/00
165/70
4,276,927 A * 7/1981 Foust ..................... F28D 9/0081
165/70
(Continued)

FOREIGN PATENT DOCUMENTS

CN 1192706 A 9/1998
CN 101251342 A 8/2008
(Continued)

OTHER PUBLICATIONS

China National Intellectual Property Administration, "First Office Action," issued in Chinese Patent Application No. 201880021478.9, which is a Chinese counterpart of U.S. Appl. No. 16/580,924, dated Jan. 26, 2021, 7 pages.

(Continued)

*Primary Examiner* — Frantz F Jules
*Assistant Examiner* — Jason N Thompson

(57) ABSTRACT

A heat treatment device includes first heat transfer bodies including first flow channels, second heat transfer bodies including second flow channels and each being stacked on the respective first heat transfer bodies, and a casing having a space communicating with the second flow channels and being in contact with each surface including the edge of the connection interface between each first heat transfer body and each second heat transfer body. The first heat transfer bodies each include a third flow channel provided in a wall portion isolating the first flow channels from the space of the casing. The first flow channels are grooves in contact with the connection interface, and the third flow channel is a groove in contact with the connection interface and intersecting with a virtual line connecting the first flow channels with the space of the casing at the connection interface.

3 Claims, 4 Drawing Sheets

(51) Int. Cl.
  *F28D 20/00* (2006.01)
  *F28F 3/10* (2006.01)
  *F28F 9/26* (2006.01)
  *F28D 21/00* (2006.01)

(58) Field of Classification Search
  USPC .......................................................... 165/70
  See application file for complete search history.

(56) References Cited

U.S. PATENT DOCUMENTS

| | | | | |
|---|---|---|---|---|
| 4,372,375 | A | * | 2/1983 | Bond ...................... F28F 3/083 |
| | | | | 165/70 |
| 4,749,032 | A | * | 6/1988 | Rosman ................ F28D 9/0018 |
| | | | | 165/167 |
| 5,193,612 | A | * | 3/1993 | Stirnkorb .................. F28F 3/10 |
| | | | | 165/167 |
| 5,958,364 | A | | 9/1999 | Dunne et al. |
| 8,453,720 | B2 | | 6/2013 | Song et al. |
| 8,985,192 | B2 | * | 3/2015 | Mitsuhashi ............. F28F 27/00 |
| | | | | 165/11.1 |
| 9,534,856 | B2 | | 1/2017 | Suzuki et al. |
| 10,603,649 | B2 | | 3/2020 | Yano et al. |
| 2002/0036078 | A1 | * | 3/2002 | Janezich ................... F28F 9/06 |
| | | | | 165/164 |
| 2007/0169916 | A1 | | 7/2007 | Wand et al. |
| 2007/0258872 | A1 | | 11/2007 | West et al. |
| 2008/0201977 | A1 | | 8/2008 | Song et al. |
| 2010/0300651 | A1 | | 12/2010 | Kumar et al. |
| 2012/0090822 | A1 | * | 4/2012 | Francois ................... F28F 3/02 |
| | | | | 165/170 |
| 2012/0247732 | A1 | | 10/2012 | Suzuki et al. |
| 2013/0146257 | A1 | | 6/2013 | Kim et al. |
| 2014/0311724 | A1 | | 10/2014 | Hiwatashi et al. |
| 2016/0265805 | A1 | * | 9/2016 | Landry ................ F28D 21/0014 |
| 2018/0093241 | A1 | | 4/2018 | Sakakura et al. |
| 2018/0093242 | A1 | | 4/2018 | Yano et al. |
| 2020/0206708 | A1 | | 7/2020 | Yano et al. |

FOREIGN PATENT DOCUMENTS

| | | |
|---|---|---|
| CN | 102449420 A | 5/2012 |
| CN | 102652249 A | 8/2012 |
| CN | 202793101 U | 3/2013 |
| CN | 105091631 A | 11/2015 |
| EP | 2 244 046 A2 | 10/2010 |
| JP | S55-122083 U | 8/1980 |
| JP | H05-043201 A | 2/1993 |
| JP | H07-294164 A | 11/1995 |
| JP | 2002-350084 A | 12/2002 |
| JP | 2007-192534 A | 8/2007 |
| JP | 2009-536143 A | 10/2009 |
| JP | 2013-119382 A | 6/2013 |
| WO | 2006/043642 A1 | 4/2006 |
| WO | 2013/069706 A1 | 5/2013 |
| WO | 2016/199790 A1 | 12/2016 |
| WO | 2016/199791 A1 | 12/2016 |

OTHER PUBLICATIONS

European Patent Office, "Extended European Search Report," issued in EP Patent Application No. 18 776 021.0, which is a European counterpart of U.S. Appl. No. 16/580,924, dated Nov. 19, 2020, 6 pages.

* cited by examiner

US 11,378,343 B2

HEAT TREATMENT DEVICE

CROSS REFERENCE TO RELATED APPLICATIONS

This application is a continuation application of International Application No. PCT/JP2018/013096, filed on Mar. 29, 2018, which claims priority to Japanese Patent Application No. 2017-072206, filed on Mar. 31, 2017, the entire contents of which are incorporated by reference herein.

BACKGROUND

1. Technical Field

The present disclosure relates to a heat exchanger-type heat treatment device.

2. Description of the Related Art

Heat exchanger-type reactors heat or cool, using a heat medium, a reaction fluid in a gas or liquid state containing a reaction raw material as a reactant so as to promote a reaction of the reactant. Such a reactor is provided with reaction channels through which a reaction fluid flows, and heat medium channels through which a heat medium flows. Heat exchange between the reaction fluid and the heat medium proceeds during a period from the introduction to the discharge of the reaction fluid and the heat medium through the respective channels.

Reactors typically use flammable gas as a reaction fluid or a heat medium, which should be treated with the utmost caution. Japanese Translation of PCT International Application Publication No. 2009-536143 (Patent Document 1) discloses technology related to a reactor having flow channels through which flammable gas flows. This reactor includes a material in each flow channel, the material not being catalytic to the combustion reaction. The material, which is formed into an appropriate shape, can prevent flame propagation in each flow channel.

SUMMARY

For example, high-pressure flammable gas used as a reaction fluid and low-pressure heating air used as a heat medium may make a fire if the reaction fluid is mixed with the heat medium. A reactor using such fluids has a stable sealing function in the respective flow channels so that the reaction fluid and the heat medium are not mixed together. However, one of the fluids might flow into a flow channel in which the other fluid flows if the sealing function in the flow channel is loosened for some reason. Any measures against a looseness of the sealing function in the flow channel are not devised in the reactor disclosed in Patent Document 1, but should be implemented to deal with the problem.

An object of the present disclosure is to provide a heat treatment device capable of avoiding a mixture of fluids used for heat exchange.

An aspect of the present disclosure is a heat treatment device utilizing heat exchange between a first fluid and a second fluid, the device including: a first heat transfer body including a first flow channel through which the first fluid flows; a second heat transfer body including a second flow channel through which the second fluid flows, the second heat transfer body being stacked on the first heat transfer body; and a casing having a space communicating with the second flow channel, the casing being in contact with a surface including an edge of a connection interface between the first heat transfer body and the second heat transfer body, the first heat transfer body further including a third flow channel provided in a wall portion isolating the first flow channel from the space of the casing, the first flow channel being a groove in contact with the connection interface, the third flow channel being a groove in contact with the connection interface and intersecting with a virtual line connecting the first flow channel with the space of the casing at the connection interface.

DESCRIPTION OF THE EMBODIMENTS

Figure 1:
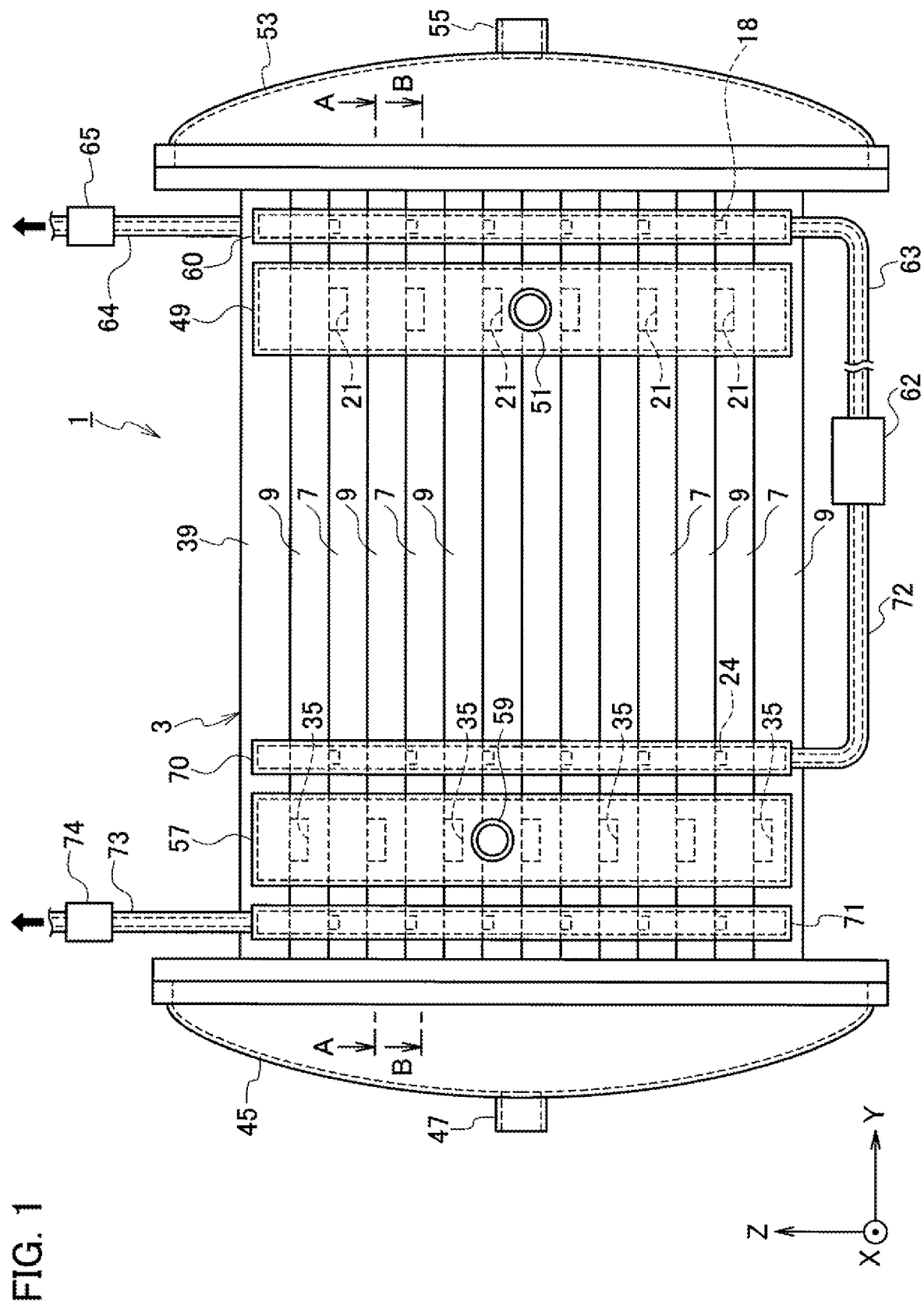
FIG. 1 is a side view showing a structure of a reactor according to an embodiment of the present disclosure.

Embodiments according to the present disclosure will be described in detail below with reference to the drawings. The following dimensions, materials, and specific numerical values described in the embodiments are shown for illustration purposes, and the present disclosure is not limited thereto unless otherwise specified. The elements having substantially the same functions and structures illustrated in the Specification and the drawings are designated by the same reference numerals, and overlapping explanations are not repeated below. The elements described below but not related directly to the present disclosure are not shown in the drawings. In the following explanations of the drawings, a vertical direction is defined as a Z-axis, an extending direction of reaction regions in the first and second reaction channels described below on a plane perpendicular to the Z-axis is defined as a Y-axis, and a direction perpendicular to the Y-axis is defined as an X-axis.

A heat treatment device according to the present disclosure utilizes heat exchange between the first fluid and the second fluid. The heat treatment device according to the present embodiment is illustrated with a case of a heat exchanger-type reactor. A reaction fluid and a product produced by a reaction each correspond to the first fluid, and a heat medium corresponds to the second fluid. The present disclosure may also be applicable to a case of a heat treatment device such as a heat exchanger.

FIG. 1 is a side view showing a structure of a reactor 1 according to the present embodiment. The reactor 1 includes a heat exchange unit 3 as a main body for executing reaction processing. The reactor 1 heats or cools a reaction fluid in a gas state or in a liquid state containing a reaction raw material as a reactant so as to promote the reaction of the reactant.

The heat exchange unit 3 includes a first heat transfer body 7 including reaction channels through which a reaction fluid and a product flow, a second heat transfer body 9 including heat medium channels through which a heat medium flows, and a lid body 39. The present embodiment is illustrated with the heat exchange unit 3 provided with a plurality of first heat transfer bodies 7 and a plurality of second heat transfer bodies 9. The heat exchange unit 3 has a counter flow-type structure in which the reaction fluid or the product and the heat medium flow in directions opposite to each other. The first heat transfer bodies 7, the second heat transfer bodies 9, and the lid body 39 are each a plate-like member made of a heat transfer material having thermal resistance.

Figure 2:
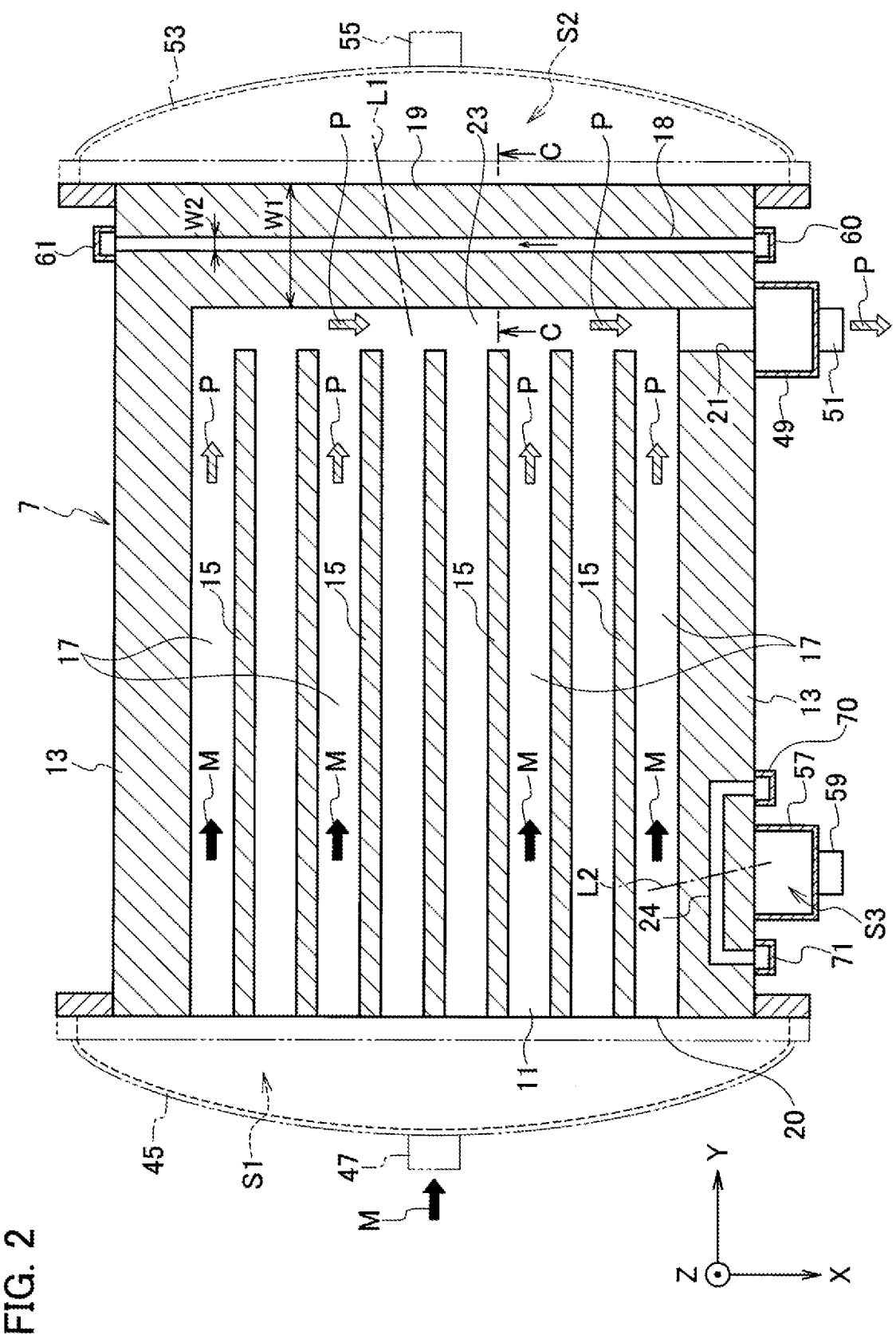
FIG. 2 is a plan view showing a structure and a shape of a part including a first heat transfer body.

FIG. 2 is a plan view corresponding to a view taken along line A-A in FIG. 1 and showing a structure and a shape of a part including the first heat transfer body 7. Each of the first heat transfer bodies 7 includes a plurality of first flow channels 17 serving as reaction channels including reaction regions. The first flow channels 17 include the reaction regions in the middle portions thereof. The first flow channels 17 receive heat or cooled air supplied from the heat medium flowing through second flow channels in the second heat transfer bodies 9 described below to cause the heat or cooled air to react with the reaction fluid M, so as to produce a product P. Each of the first flow channels 17 is a groove having an open first side surface on one side of the respective first heat transfer bodies 7 with the upper side open in the Z direction. The first flow channels 17 extend straight from first introduction ports 20 from which the reaction fluid M is introduced to a portion immediately in front of a second side surface on the other side of the respective first heat transfer bodies 7 in the Y direction. The first flow channels 17 each have a rectangular shape in cross section. The first flow channels 17 are arranged at regular intervals in the X direction. Although not shown, a catalyst body for promoting the reaction of the reactant may be provided in the respective first flow channels 17.

The first heat transfer bodies 7 each include a first base 11, two first side walls 13, a plurality of first interposition walls 15, and a first partition wall 19. The first base 11 has a rectangular plate-like shape covering the entire X-Y plane of the respective first heat transfer bodies 7. The first side walls 13 are wall portions provided on both right and left sides of the extending direction of the first flow channels 17 on one of the main surfaces of the first base 11 perpendicular to the Z direction. The respective interposition walls 15 are wall portions interposed between the two first side walls 13 on one of the main surfaces of the first base 11 and arranged at regular intervals in parallel to the first side walls 13. The first partition wall 19 extends in the X direction orthogonal to the extending direction of the first flow channels 17 on the second side surface side on one of the main surfaces of the first base 11. If the first flow channels 17 extend to the second side surface, the first flow channels 17 would reach a second space S2 described below in which the heat medium HC is introduced. The provision of the first partition wall 19 changes the flowing direction of the product P passing through the respective first flow channels 17. The height of each of the first side walls 13, the first interposition walls 15, and the first partition wall 19 is the same.

The first heat transfer bodies 7 each include a first communication flow channel 23 extending along the inner surface of the first partition wall 19. The first communication flow channel 23 communicates with all of the first flow channels 17, and also communicates at one end with a first drain port 21 provided at one of the first side walls 13 so as to discharge the product P to the outside of the respective first heat transfer bodies 7. Although the first communication flow channel 23 is indicated separately from the first flow channels 17, for illustration purposes, the first communication flow channel 23 and the first flow channels 17 are the same kind of channels with the same function to allow the reaction fluid M and the product P to flow therethrough. FIG. 2 illustrates a case in which all of the fluids flowing through the first flow channels 17 and led to the first drain port 21 are indicated as the product P, but the fluids actually may include the reaction fluid M not used for the reaction.

The first heat transfer bodies 7 each further include a third flow channel 18 in the first partition wall 19. The third flow channel 18 is independent of the first flow channels 17 and the first communication flow channel 23 through which the reaction fluid M or the product P flows. The third flow channel 18 isolates the first flow channels 17 and the first communication flow channel 23 from the second side surface facing the second space S2 in a heat medium introduction part 53 described below. The third flow channel 18 is a groove, with the upper side open in the Z direction, extending straight parallel to the extending direction of the first communication flow channel 23 and the second side surface in the X direction. The third flow channel 18 has a rectangular shape in cross section.

The first flow channels 17, the first communication flow channel 23, and the third flow channel 18 are provided on one of the main surfaces of the first heat transfer body 7. The term "main surface" refers to a connection interface stacked with the respective second heat transfer bodies 9, or with the lid body 39 in a particular case. Both ends of the third flow channel 18 are open on any side surfaces of the first heat transfer body 7. The present embodiment is illustrated with the case having four side surfaces connected to the main surface of the first heat transfer body 7 including, in addition to the above first and second side surfaces, a third side surface which is one of the side surfaces perpendicular to the first and second side surfaces, and a fourth side surface which is the other side surface. One end of the third flow channel 18 in this case is open on the third side surface, and the other end of the third flow channel 18 is open on the fourth side surface.

As illustrated in FIG. 2, the third flow channel 18 intersects with a virtual line L1 connecting the first flow channels 17 or the first communication flow channel 23 with the second space S2 on the X-Y plane. When a width of the first partition wall 19 between the inner surface facing the first communication flow channel 23 and the outer surface facing the second space S2 is defined as W1, and a width of the third flow channel 18 is defined as W2, the width W2 is smaller than the width W1. The cross section of the third flow channel 18 may be smaller than the cross section of the first flow channels 17 or the first communication flow channel 23.

Figure 3:
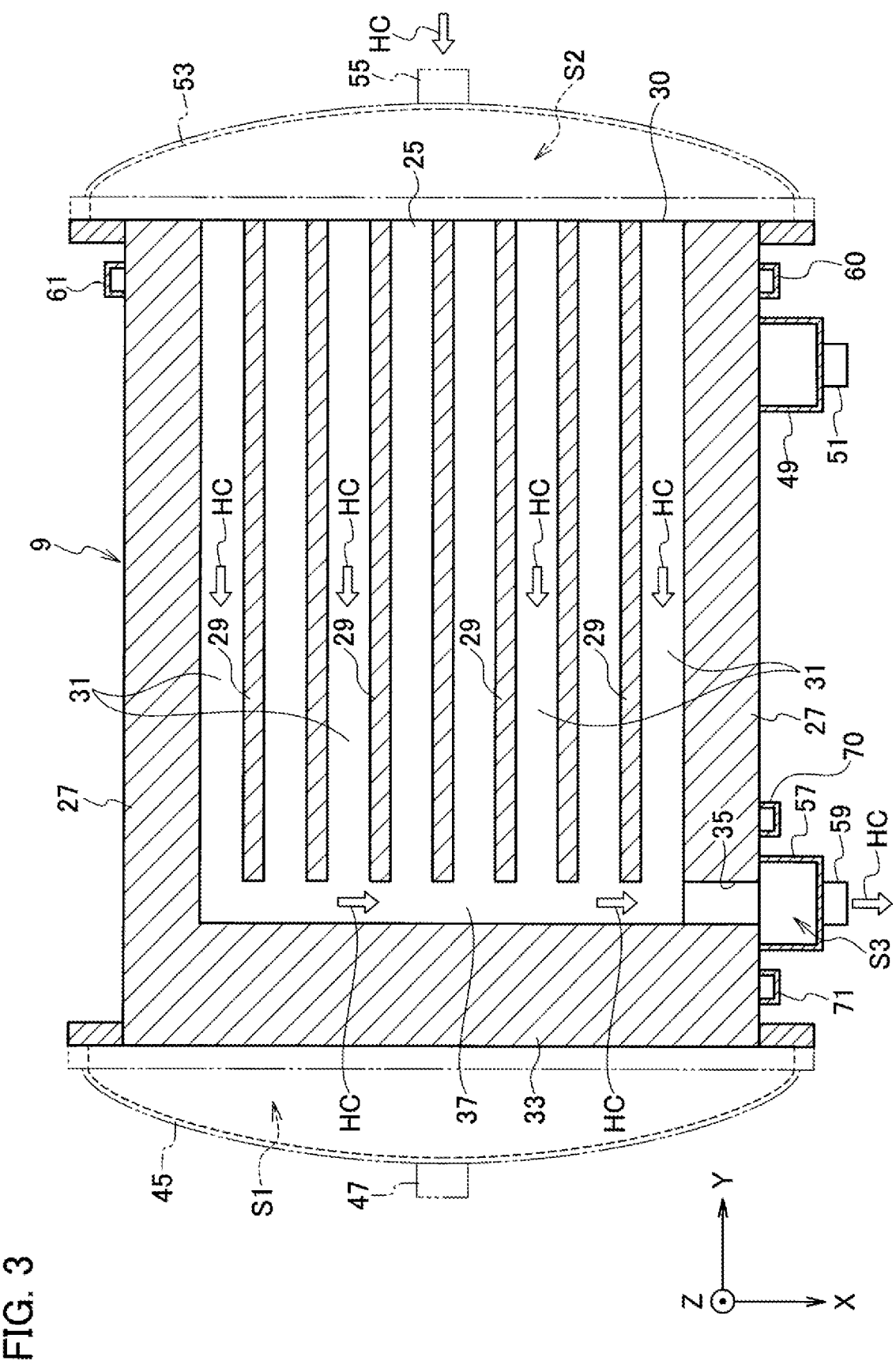
FIG. 3 is a plan view showing a structure and a shape of a part including a second heat transfer body.

FIG. 3 is a plan view corresponding to a view taken along line B-B in FIG. 1 and showing a structure and a shape of a part including the second heat transfer body 9. Each of the second heat transfer bodies 9 includes a plurality of second flow channels 31 serving as heat medium channels. The second flow channels 31 supply heat or cooled air supplied from the heat medium HC to the outside, namely, to the first heat transfer bodies 7. Each of the second flow channels 31 is a groove having an open first side surface on one side of the respective second heat transfer bodies 9 with the upper side open in the Z direction. The second flow channels 31 extend straight from second introduction ports 30 from which the heat medium HC is introduced to a portion immediately in front of a second side surface on the other side of the second heat transfer bodies 9 in the Y direction. The second flow channels 31 each have a rectangular shape in cross section. The first side surface of the respective second heat transfer bodies 9 is located on the opposite side of the first side surface of the respective first heat transfer bodies 7 described above in the Y direction. The second flow channels 31 are arranged at regular intervals in the X direction, as in the case of the first flow channels 17. Although not shown, the second flow channels 31 may each be provided with a heat transfer promoting body for increasing the contact area with the heat medium to promote heat transfer between the heat medium and the respective second heat transfer bodies 9.

The second heat transfer bodies 9 each include a second base 25, two second side walls 27, a plurality of second interposition walls 29, and a second partition wall 33. The second base 25 has a rectangular plate-like shape covering the entire X-Y plane of the respective second heat transfer bodies 9. The second side walls 27 are wall portions provided on both right and left sides of the extending direction of the second flow channels 31 on one of the main surfaces of the second base 25 perpendicular to the Z direction. The respective interposition walls 29 are wall portions interposed between the two second side walls 27 on one of the main surfaces of the second base 25 and arranged at regular intervals in parallel to the second side walls 27. The second partition wall 33 extends in the X direction orthogonal to the extending direction of the second flow channels 31 on the second side surface side on one of the main surfaces of the second base 25. If the second flow channels 31 extend to the second side surface, the second flow channels 31 would reach a first space S1 described below in which the reaction fluid M is introduced. The provision of the second partition wall 33 changes the flowing direction of the heat medium HC passing through the respective second flow channels 31. The height of each of the second side walls 27, the second interposition walls 29, and the second partition wall 33 is the same.

The second heat transfer bodies 9 each include a second communication flow channel 37 extending along the inner surface of the second partition wall 33. The second communication flow channel 37 communicates with all of the second flow channels 31. The second communication flow channel 37 communicates at one end with a second drain port 35 provided at one of the second side walls 27 so as to discharge the heat medium HC to the outside of the respective second heat transfer bodies 9.

As shown in FIG. 1, the heat exchange unit 3 is fabricated as a connected body or a stacked body such that the lid body 39 is arranged on the uppermost side in the Z direction, and the second heat transfer bodies 9 and the first heat transfer bodies 7 are alternately connected to and stacked with each other below the lid body 39. When the heat exchange unit 3 is assembled, the respective members are fixed to each other by a bonding method such as tungsten inert gas (TIG) welding or diffusion bonding, so as to suppress a reduction in heat transfer derived from poor contact between the respective members.

The heat transfer material used for the respective elements included in the heat exchange unit 3 is preferably thermally-resistant metal such as an iron alloy or a nickel alloy. More particularly, the thermally-resistant alloy may be an iron alloy such as stainless steel, or a nickel alloy such as Inconel alloy 625 (registered trademark), Inconel alloy 617 (registered trademark), and Haynes alloy 230 (registered trademark). These heat transfer materials are preferable because such alloys have durability or corrosion resistance with respect to flammable gas which may be used for promoting the reaction in the first flow channels 17 or used as a heat medium. However, the present embodiment is not limited to these materials. Alternatively, the heat transfer material may be iron-based plated steel, metal covered with thermally-resistant resin such as fluororesin, or carbon graphite.

While the heat exchange unit 3 may be composed of at least a pair of one first heat transfer body 7 and one second heat transfer body 9, a larger number of the respective heat transfer bodies can improve the heat exchange performance. The number of the first flow channels 17 provided in each first heat transfer body 7 and the number of the second flow channels 31 provided in each second heat transfer body 9 may be determined as appropriate, and may be changed in view of the designing conditions or heat transfer efficiency of the heat exchange unit 3. Although the heat exchange unit 3 according to the present embodiment itself serves as a main body of the reactor 1, the heat exchange unit 3 may be covered with a housing or surrounded by a heat insulator so as to avoid heat radiation to prevent heat loss.

The reactor 1 also includes a reaction fluid introduction part 45 and a product drain part 49, and a heat medium introduction part 53 and a heat medium drain part 57.

The reaction fluid introduction part 45 is a casing curved concavely. The reaction fluid introduction part 45 covers the side surface of the heat exchange unit 3 on the side on which the first introduction ports 20 of the first flow channels 17 are open to define the first space S1 together with the heat exchange unit 3. The reaction fluid introduction part 45 is detachable or openable with respect to the heat exchange unit 3. The detachable or openable reaction fluid introduction part 45 allows the operator to insert or remove the catalyst body into or from the respective first flow channels 17, for example. The reaction fluid introduction part 45 includes a first introduction pipe 47 from which the reaction fluid M is externally introduced to the inside of the heat exchange unit 3. The first introduction pipe 47 is located in the middle on the side surface of the heat exchange unit 3, in particular, located in the middle on the X-Z plane, and is connected to the reaction fluid introduction part 45 in the same direction as the open direction of the respective first introduction ports 20. Such a structure can distribute the reaction fluid M introduced from one portion to the respective first introduction ports 20.

The product drain part 49 is a box-shaped casing with one surface open. The product drain part 49 is arranged on the third side surface of the heat exchange unit 3 such that the open surface faces toward the respective first drain ports 21 of the first heat transfer bodies 7. The product drain part 49 includes a first drain pipe 51 at a part of the wall portion thereof for discharging the product P from the inside to the outside of the heat exchange unit 3. The first drain pipe 51 is connected to another external treatment device (not shown) for executing aftertreatment of the product P. The product P discharged from the respective first drain ports 21 is thus recovered through the single first drain pipe 51.

The heat medium introduction part 53 is a casing curved concavely, as in the case of the reaction fluid introduction part 45. The heat medium introduction part 53 covers the side surface of the heat exchange unit 3 on the side on which the second introduction ports 30 of the second flow channels 31 are open to define the second space S2 together with the heat exchange unit 3. The heat medium introduction part 53 is detachable or openable with respect to the heat exchange unit 3. The detachable or openable heat medium introduction part 53 allows the operator to insert or remove the heat transfer promoting body into or from the respective second flow channels 31, for example. The heat medium introduction part 53 includes a second introduction pipe 55 from which the heat medium HC is externally introduced to the inside of the heat exchange unit 3. The second introduction pipe 55 is located in the middle on the side surface of the heat exchange unit 3, in particular, located in the middle on the X-Z plane, and is connected to the heat medium introduction part 53 in the same direction as the open direction of the respective second introduction ports 30. Such a structure can distribute the heat medium HC introduced from one portion to the respective second introduction ports 30.

The heat medium drain part 57 is a box-shaped casing with one surface open, as in the case of the product drain part 49. The heat medium drain part 57 is arranged on the third side surface of the heat exchange unit 3 such that the open surface faces toward the respective second drain ports 35 of the second heat transfer bodies 9. The heat medium drain part 57 covers the side surface of the heat exchange unit 3 on which the respective second drain ports 35 are open to define a third space S3 together with the heat exchange unit 3. The heat medium drain part 57 includes a second drain pipe 59 at a part of the wall portion thereof for discharging the heat medium HC from the inside to the outside of the heat exchange unit 3. The second drain pipe 59 is connected to another external treatment device (not shown) for reusing the heat medium HC. The heat medium HC discharged from the respective second drain ports 35 is thus recovered through the single second drain pipe 59.

The reactor 1 also includes a first gas distribution system for causing purge gas serving as a third fluid not involved in the reaction treatment to flow in the respective third flow channels 18. The first gas distribution system includes a gas supply part 62, a first gas introduction part 60, a first gas drain part 61, a third introduction pipe 63, and a third drain pipe 64. The third introduction pipe 63 allows the purge gas to flow between the gas supply part 62 and the first gas introduction part 60. The third drain pipe 64 communicates at one end with the first gas drain part 61.

The gas supply part 62 supplies the purge gas to the respective third flow channels 18. The purge gas is preferably nitrogen ($N_2$), for example. The gas supply part 62 preferably keeps supplying the purge gas constantly during the reaction treatment executed in the heat exchange unit 3.

The first gas introduction part 60 is a box-shaped casing with one surface open. The first gas introduction part 60 is arranged on the third side surface of the heat exchange unit 3 such that the open surface faces toward the openings on one side of the respective third flow channels 18 on which purge gas introduction ports are defined. The third introduction pipe 63 is connected to a part of the wall portion of the first gas introduction part 60. Such a structure can distribute the purge gas introduced from one portion to the respective openings on one side of the third flow channels 18.

The first gas drain part 61 is a box-shaped casing with one surface open, as in the case of the first gas introduction part 60. The first gas drain part 61 is arranged on the fourth side surface of the heat exchange unit 3 such that the open surface faces toward the openings on the other side of the respective third flow channels 18 on which purge gas drain ports are defined. The third drain pipe 64 is connected to a part of the wall portion of the first gas drain part 61. Such a structure can further discharge the purge gas discharged from the respective openings on the other side of the respective third flow channels 18 through the single third drain pipe 64.

The third drain pipe 64 is open to the outside of the reactor 1. The third drain pipe 64 may be equipped with a first gas detection sensor 65 capable of detecting the presence or absence of the reaction fluid M or the product P or the concentration thereof. The first gas detection sensor 65 may be connected to a display device or a warning device (not shown) for notifying the operator of what the reaction fluid M or the product P is detected.

The heat exchange body 3 may be any of a liquid-liquid heat exchanger, a gas-gas heat exchanger, and a gas-liquid heat exchanger, and the reaction fluid M and the heat medium HC supplied to the reactor 1 may be either gas or liquid. The reactor 1 can cause chemical synthesis through various kinds of thermal reactions such as an endothermic reaction and an exothermic reaction. Examples of such thermal reactions causing synthesis include: a steam reforming reaction of methane as represented by the following chemical equation (1); an endothermic reaction such as a dry reforming reaction of methane as represented by the following chemical equation (2); a shift reaction as represented by the following chemical equation (3); and a methanation reaction as represented by the following chemical equation (4). Still another example is a Fischer Tropsch synthesis reaction as represented by the following chemical equation (5) as a thermal reaction causing synthesis. The reaction fluid M used in these reactions is in a gas state.

$$CH_4 + H_2O \rightarrow 3H_2 + CO \quad (1)$$

$$CH_4 + CO_2 \rightarrow 2H_2 + 2CO \quad (2)$$

$$CO + H_2O \rightarrow CO_2 + H_2 \quad (3)$$

$$CO + 3H_2 \rightarrow CH_4 + H_2O \quad (4)$$

$$(2n+1)H_2 + nCO \rightarrow C_nH_{2n+2} + nH_2O \quad (5)$$

The heat medium HC is preferably a fluid substance not corroding the constituent materials of the reactor 1, and may be a liquid substance such as water or oil, or a gaseous substance such as heating air or flammable gas. The gaseous substance used as the heat medium HC is easier to handle than the liquid medium.

Next, the function according to the present embodiment is described below.

Figure 4A:
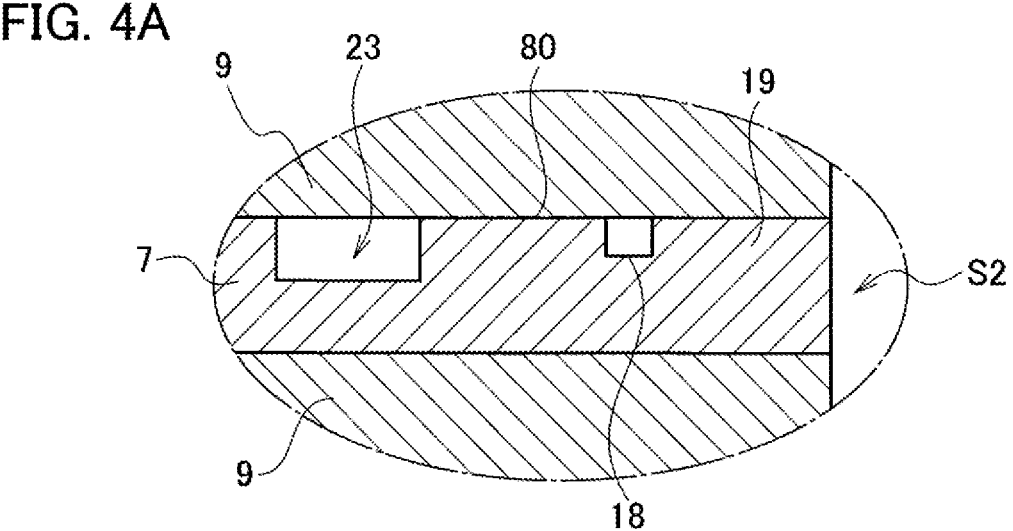
FIG. 4A is a diagram showing a state in which a connection interface between the first heat transfer body and the second heat transfer body is sealed appropriately.

FIG. 4 is a schematic cross-sectional view corresponding to a view taken along line C-C in FIG. 2 for illustrating the function of the respective third flow channels 18. FIG. 4A is a view showing a configuration according to the present embodiment and illustrating a state in which a connection interface 80 between the first heat transfer body 7 and the second heat transfer body 9 is sealed appropriately. Since a gap between the first partition wall 19 of the first heat transfer body 7 and the second heat transfer body 9 stacked thereon is sealed, the product P flowing through the first communication flow channel 23 is totally led to the first drain port 21 appropriately.

Figure 4B:
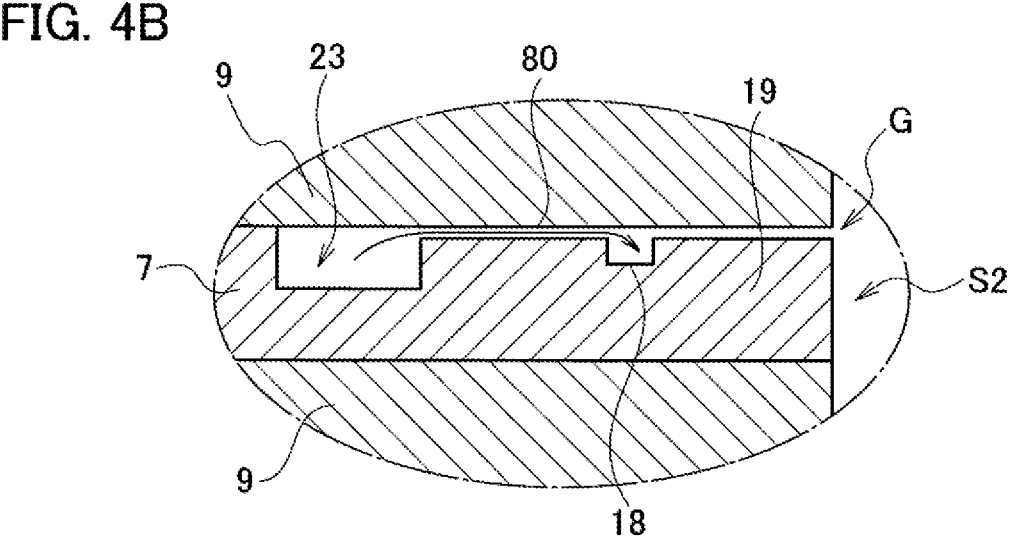
FIG. 4B is a diagram showing a state in which a sealing function at the connection interface between the first heat transfer body and the second heat transfer body is loosened.
Figure 4C:
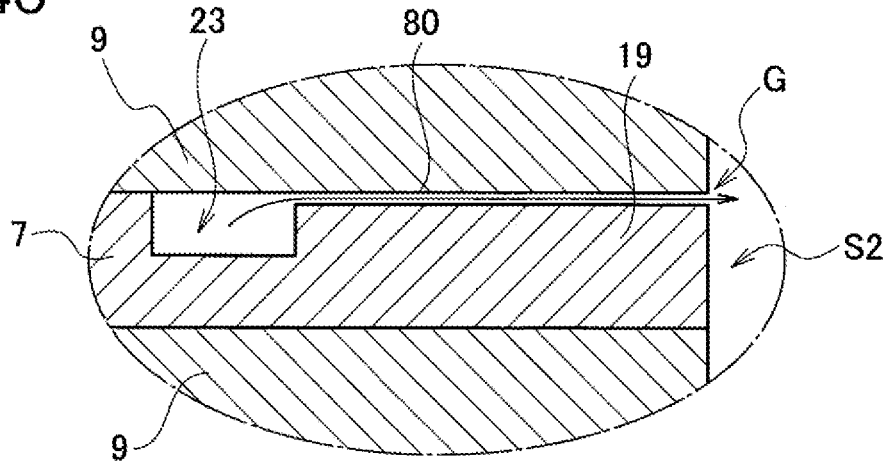
FIG. 4C is a diagram showing a state, as an example of reference, in which the sealing function at the connection interface between the first heat transfer body and the second heat transfer body is loosened when a third flow channel according to the embodiment is not provided.

FIG. 4B is a view showing a configuration according to the present embodiment and illustrating a state in which the sealing function is loosened such that the first communication flow channel 23 is caused to communicate with the second space S2 in the heat medium introduction part 53 though the first partition wall 19. As used herein, the expression "the sealing function is loosened" indicates a state in which the sealing function is partly diminished because of poor contact between the first partition wall 19 and the second heat transfer body 9. FIG. 4B and FIG. 4C each indicate the part at which the sealing function is loosened at the connection interface 80 by a gap G in an exaggerated way.

The gas supply part 62 constantly supplies the purge gas during the reaction treatment executed in the heat exchange unit 3 so as to allow the purge gas to flow into the third flow channels 18. When the gap G is presumed to be caused in the first partition wall 19 as shown in FIG. 4B during the reaction treatment, the product P flowing in the first communication flow channel 23 flows toward the second space S2 through the gap G. The present embodiment, provided with the third flow channel 18 in the first partition wall 19, can allow the product P flowing toward the second space S2 to leak in the third flow channel 18. Since the purge gas is flowing in the third flow channel 18, the product P entering the third flow channel 18 is led to the first gas drain part 61 together with the purge gas, and is further discharged externally to the air through the third drain pipe 64 in a safe location at normal temperature. As shown in FIG. 2, since the third flow channel 18 is arranged to intersect with the virtual line L1 connecting the first flow channels 17 and the second space S2, the product P flowing toward the second space S2 reaches the third flow channel 18 if the sealing function is loosened. Further, since the third flow channel 18 is open on both sides on some of the side surfaces of the first heat transfer body 7, the product P flowing toward the second space S2 can be led to reach the third flowing channel 18 if the sealing function is loosened at a part adjacent to the side surfaces of the first heat transfer body 7, for example. The present embodiment can also allow the piping system for causing the purge gas to flow therethrough, such as the first gas introduction part 60 and the first gas drain part 61, to communicate with the third flow channels 18 simply by providing the piping system on the side surface of the first heat transfer bodies 7. Namely, the present embodiment can facilitate the installation of such a piping system.

The width W2 (refer to FIG. 2) or the size in cross section of the third flow channel 18 may be determined as appropriate according to the function described above and further depending on the entire shape of the heat exchange unit 3, the processing method, or the type or characteristics of the reaction treatment. For example, the width W2 is preferably set in a range of 0.5 to 3 mm, when the present embodiment is applied to the reaction treatment described above, the width of the respective first flow channels 17 is about 10 mm, the width W1 of the first partition wall 19 (refer to FIG. 2) is sufficiently greater than the width W2, and the connection area can be ensured sufficiently at the first partition wall 19. It should be understood that the width W2 could be greater than the above range, which may vary depending on the respective conditions described above.

The first gas detection sensor 65, when provided in the third drain pipe 64, can detect the product P in the purge gas. Namely, the operator can recognize the looseness of the sealing function in the first partition wall 19 depending on the output from the first gas detection sensor 65.

FIG. 4C is a view, as an example of reference, showing a configuration different from the present embodiment, illustrating a state in which the sealing function is loosened such that the first communication flow channel 23 is caused to communicate with the second space S2 in the heat medium introduction part 53 through the first partition wall 19. The respective elements shown in FIG. 4C corresponding to those according to the present embodiment are indicated by the same reference numerals, and overlapping explanation are not repeated below.

The configuration shown in FIG. 4C different from the present embodiment does not include the third flow channel 18 in the first partition wall 19. The presence of the gap G allows the product P flowing through the first communication flow channel 23 to leak in the second space S2 through the gap G. When the product P is particularly high-pressure flammable gas, and the heat medium HC is low-pressure heating air, the mixture of the product P with the heat medium HC is not preferable because it may make a fire.

The embodiment illustrates above the third flow channel 18 provided in the first partition wall 19 to function appropriately when the sealing function is loosened. The third flow channel functioning appropriately when the sealing function is loosened is not limited to that provided in the first partition wall 19. For example, as further shown in FIG. 1 to FIG. 3, the respective first heat transfer bodies 7 may include a third flow channel 24 provided in one of the first side walls 13 independently of the first flow channels 17 and the first communication flow channel 23.

The third flow channel 24 isolates one of the first flow channels 17 adjacent to the corresponding first side wall 13 from the third side surface facing the third space S3 in the heat medium drain part 57. The third flow channel 24 is a groove, with the upper side open in the Z direction, extending straight parallel to the extending direction of the first flow channel 17 and the third side surface in the Y direction, and further extending at both ends toward the third side surface. The third flow channel 24 has a rectangular shape in cross section. As illustrated in FIG. 2, the third flow channel 24 intersects with a virtual line L2 connecting the first flow channel 17 with the third space S3. Both ends of the third flow channel 24 are open on the third side surface.

The reactor 1 includes a second gas distribution system for causing purge gas serving as a third fluid not involved in the reaction treatment to flow in the respective third flow channels 24. The second gas distribution system includes a second gas introduction part 70, a second gas drain part 71, a fourth introduction pipe 72, and a fourth drain pipe 73. The fourth introduction pipe 72 allows the purge gas to flow between the gas supply part 62 and the second gas introduction part 70. The fourth drain pipe 73 communicates at one end with the second gas drain part 71.

The first gas distribution system and the second gas distribution system can share the gas supply part 62. The respective gas distribution systems may instead include each gas supply part independently of each other.

The second gas introduction part 70 is a box-shaped casing with one surface open, as in the case of the first gas introduction part 60. The second gas introduction part 70 is arranged on the third side surface of the heat exchange unit 3 such that the open surface faces toward the openings on one side of the respective third flow channels 24 on which purge gas introduction ports are defined. The fourth introduction pipe 72 is connected to a part of the wall portion of the second gas introduction part 70. Such a structure can distribute the purge gas introduced from one portion to the respective openings on one side of the third flow channels 24.

The second gas drain part 71 is a box-shaped casing with one surface open, as in the case of the first gas drain part 61. The second gas drain part 71 is arranged on the third side surface of the heat exchange unit 3 such that the open surface faces toward the openings on the other side of the respective third flow channels 24 on which purge gas drain ports are defined, as in the case of the second gas introduction part 70. The fourth drain pipe 73 is connected to a part of the wall portion of the second gas drain part 71. Such a structure can further discharge the purge gas discharged from the respective openings on the other side of the respective third flow channels 24 through the single fourth drain pipe 73.

The fourth drain pipe 73 is open to the outside of the reactor 1, as in the case of the third drain pipe 64. The fourth drain pipe 73 may also be equipped with a second gas detection sensor 74 capable of detecting the presence or absence of the reaction fluid M or the product P or the concentration thereof. The second gas detection sensor 74 may be connected to a display device or a warning device (not shown) for notifying the operator of what the reaction fluid M or the product P is detected.

The gas supply part 62 constantly supplies the purge gas during the reaction treatment executed in the heat exchange unit 3 so as to allow the purge gas to flow into the third flow channels 24. When the gap G is caused in the first side wall 13 during the reaction treatment, as in the case shown in FIG. 4, the product P flowing in the first flow channel 17 flows toward the third space S3 in the heat medium drain part 57 through the gap G. The present embodiment, provided with the third flow channel 24 also in the first side wall 13, can allow the product P flowing toward the second space S3 to leak in the third flow channel 24. Since the purge gas is flowing in the third flow channel 24 as described above, the product P entering the third flow channel 24 is led to the second gas drain part 71 together with the purge gas, and is further discharged externally to the air through the fourth drain pipe 73 in a safe location at normal temperature.

The embodiment is illustrated above with the case of detecting the first fluid which is flowing in the first flow channels 17, but is likely to leak toward the second flow channels 31 in which the second fluid flows if the sealing function is loosened. The embodiment is also illustrated above with the case in which the first gas detection sensor 65 is presumed to detect the product P as the first fluid in the purge gas. The present embodiment is not limited to the cases described above. The present embodiment may also be applied to a case in which the second fluid is presumed to be detected that is flowing in the second flow channels 31 but is likely to leak toward the first flow channels 17 in which the first fluid flows, and the first gas detection sensor 65 then detects the heat medium as the second fluid in the purge gas. For example, when the heat medium is steam or heating air, a sensor capable of detecting the presence or absence of oxygen ($O_2$) or the concentration thereof can be used as the first gas detection sensor 65 or the second gas detection sensor 74.

Next, the effects according to the present embodiment are described below.

The heat treatment device 1, which utilizes the heat exchange between the first fluid and the second fluid, includes the first heat transfer bodies 7 each including the first flow channels 17 through which the first fluid flows, and the second heat transfer bodies 9 each including the second flow channels 31 through which the second fluid flows and stacked on the respective first heat transfer bodies 7. The heat treatment device 1 also includes the casing having a space communicating with the second flow channels 31, the casing being in contact with each surface including the edge of the connection interface 80 between each first heat transfer body 7 and each second heat transfer body 9. The first heat transfer bodies 7 each also include the third flow channel provided in the wall portion isolating the respective first flow channels 17 from the space of the casing. The first flow channels 17 are grooves in contact with the connection interface 80. The third flow channel is a groove in contact with the connection interface 80 and intersecting with a virtual line connecting the respective first flow channels 17 with the space of the casing at the connection interface 80.

The casing can correspond to the heat medium introduction part 53. The space communicating with the second flow channels 31 corresponds to the second space S2 in this case. The third flow channel 18 in this case intersects with the virtual line L1 connecting the respective first flow channels 17 with the second space S2 at the connection interface 80.

Alternatively, the casing can correspond to the heat medium drain part 57. The space communicating with the second flow channels 31 corresponds to the third space S3 in this case. The third flow channel 24 in this case intersects with the virtual line L2 connecting the corresponding first flow channel 17 with the third space S3 at the connection interface 80.

The heat treatment device according to the present embodiment can prevent the first fluid and the second fluid from being mixed together if the sealing function between the respective first flow channels 17 and the second space S2 is loosened, since the fluid leaking out of the first flow channels 17 is to be discharged to the outside via the third flow channel 18. The heat treatment device can avoid a mixture of the first fluid and the second fluid and thus can greatly reduce the possibility of making a fire derived from the mixture of these fluids, when the first fluid corresponds to the reaction fluid M and the product P produced by the reaction, and the second fluid corresponds to the heat medium HC.

In the state in which the first heat transfer bodies 7 including the first flow channels 17 and the second heat transfer bodies 9 including the second flow channels 31 are alternately stacked together, and the open surfaces of the first flow channels 17 face toward the respective second heat transfer bodies 9, the region in which the sealing function is presumed to be loosened most is the connection interface 80. The third flow channel is thus most preferably formed into a groove in contact with the connection interface 80 as in the case of the first flow channels 17 so as to discharge the fluid leaking out of the first flow channels 17.

In the heat treatment device according to the present embodiment, both ends of the third flow channel are open on the side surface different from the surface of the first heat transfer body 7 toward the connection interface 80.

As used in the above example, the side surface which is different from the surface of the first heat transfer body 7 toward the connection interface 80 refers to the third side surface or the fourth side surface connected to each of the first side surface facing the first space S1 and the second side surface facing the second space S2.

The heat treatment device according to the present embodiment can use a simple casing, as the first gas introduction part 60 or the first gas drain part 61 communicating with the respective third flow channels 18, easy to install to cover part of the third side surface or the fourth side surface of the heat exchange unit 3. In other words, the piping system for supplying gas to the third flow channels 18 or discharging gas from the third flow channels 18 does not need to penetrate the heat exchange unit 3, or does not need to be complicatedly arranged at the outside of the heat exchange unit 3, so as to reduce the entire size of the heat treatment device. The simple casing easy to install to cover part of the third side surface of the heat exchange unit 3 can also be used for each of the second gas introduction part 70 or the second gas drain part 71 communicating with the third flow channels 24.

The heat treatment device according to the present embodiment also includes the gas supply part 62 communicating with one end of the respective third flow channels 18 and 24 to supply purge gas to the third flow channels 18 and 24.

The heat treatment device according to the present embodiment can discharge the first fluid leaking out of the first flow channels 17 immediately together with the purge gas flowing in the third flow channels 18 and 24 if the sealing function between the respective first flow channels 17 and the second space S2 or the third space S3 is loosened. The mixture of the first fluid and the second fluid can be prevented more accurately.

The heat treatment device according to the present embodiment also includes the gas detection sensors 65 and 74 communicating with the other end of the respective third flow channels 18 and 24 and capable of detecting the first fluid or the second fluid contained in the purge gas.

The heat treatment device according to the present embodiment enables the operator to immediately recognize the looseness of the sealing function between the respective first flow channels 17 and the second space S2 or the third space S3 according to the output from the first gas detection sensor 65 or the second gas detection sensor 74.

Other Embodiments

The above embodiment has exemplified the case in which the third flow channel 18 is provided in the first partition wall 19 of the first heat transfer body 7, but is not limited to this case. For example, a pipe-like member may be installed as the third flow channel that has an open surface conforming to the edge of the connection interface between the first heat transfer body 7 and the second heat transfer body 9 along the second side surface of the heat exchange unit 3 facing the second space S2. Since the edge of the connection interface between the first heat transfer body 7 and the second heat transfer body 9 extends straight in the X direction, the pipe-like member serving as the third flow channel in this case also extends straight in the X direction so as to conform to the edge of the connection interface. The first fluid is to lead out of the edge of the connection interface if the sealing function between the respective first flow channels 17 and the second space S2 is loosened, so as to prevent the first fluid from entering the second space S2. As in the case of the above embodiment, the gas supply part 62 then needs to be connected to communicate with one end of the respective pipe-like members, and the third drain pipe 64 for discharging the purge gas to the outside also needs to be connected to communicate with the other end of the respective pipe-like members.

The above embodiment has exemplified the case of the two kinds of heat transfer bodies composing the heat exchange unit 3, including the first heat transfer bodies 7 each including the first flow channels 17 through which the first fluid flows, and the second heat transfer bodies 9 each including the second flow channels 31 through which the second fluid flows. The present disclosure is not limited to the heat exchange unit 3 having such a configuration. For example, the present disclosure may be applicable to a case in which the heat exchange unit 3 includes one kind of heat transfer bodies each including both of the first flow channels through which the first fluid flow and the second flow channels through which the second fluid flows. In such a case, a wall portion isolating the first flow channels from the second flow channels or the second space S2 may correspond to the first partition wall 19 described above, so that the third flow channel 18 described above is provided in the wall portion. This configuration can also prevent the first fluid from entering the second flow channels and the second space S2.

The above embodiment has exemplified the case in which the first gas detection sensor 65 is installed in the third drain pipe 64. Alternatively, the same number of gas detection sensors as the third flow channels 18 corresponding to the number of the first heat transfer bodies 7 may be prepared so as to be installed adjacent to the openings of the third flow channels 18 at the other ends. In such a case, the installation position of the respective gas detection sensors can be preliminarily recognized, so as to specify the corresponding first heat transfer body 7 in which the sealing function between the first flow channels 17 and the second space S2 is loosened.

The above embodiment has been illustrated with the case in which the heat exchange unit 3 has a counter flow-type structure in which the first fluid flows in the first flow channels 17 in the direction opposite to the flowing direction of the second fluid flowing in the second flow channels 31, but the heat exchange unit 3 may have a parallel flow-type structure in which the respective fluids flow in the same direction. The present disclosure thus can be applicable to any case in which the first fluid and the second fluid flow in either direction.

The above embodiment has been illustrated with the case in which the first heat transfer bodies 7 and the second heat transfer bodies 9 composing the heat exchange unit 3 are alternately stacked on one another in the Z direction which is the vertical direction, but the present disclosure is not limited to this case. For example, several sets of the respective heat transfer bodies composing the heat exchange unit 3 transversely connected to each other may be stacked in the Z direction.

Although several embodiments have been described herein, it is to be understood that other variations and modifications of the embodiments are possible in light of the teachings of the present disclosure. The features of all embodiments and all claims can be combined with each other as long as they do not contradict each other.

What is claimed is:

1. A heat treatment device utilizing heat exchange between a first fluid and a second fluid, the device comprising:
    a first heat transfer body including a first flow channel through which the first fluid flows;
    a second heat transfer body including a second flow channel through which the second fluid flows, the second heat transfer body being stacked on the first heat transfer body; and
    a casing having a space communicating with one end of the second flow channel, the casing being in contact with a surface including an edge of a connection interface between the first heat transfer body and the second heat transfer body,
    wherein
    the first heat transfer body and the second heat transfer body are plate-like members having a first side surface, a second side surface being the opposite of the first side surface, a third side surface being perpendicular to the first side surface, and a fourth side surface being the opposite of the third side surface, and the first side surface, the second side surface, the third side surface, and the fourth side surface are perpendicular to the connection interface, respectively, the first heat transfer body further includes a wall portion between the first flow channel and the space of the casing, the wall portion forming a third flow channel independent of the first flow channel, the first flow channel is in contact with the connection interface, the first flow channel having three inner surfaces constituting a first groove formed in the first heat transfer body and one inner surface being a part of the second heat transfer body facing the first groove in the first flow channel, the second flow channel has three inner surfaces constituting a second groove formed on a surface opposite to the connection interface in the second heat transfer body, the third flow channel is in contact with the connection interface, the third flow channel having three inner surfaces constituting a third groove formed in the first heat transfer body and one inner surface being a part of the second heat transfer body facing the third groove in the third flow channel, and the third flow channel intersecting with a virtual line connecting the first flow channel with the space of the casing at the connection interface, one end of the first flow channel is opened from the first side surface of the first heat transfer body, the other end of the first flow channel is opened from the third side surface or the fourth side surface of the first heat transfer body, the one end of the second flow channel is opened from the second side surface of the second heat transfer body, the other end of the second flow channel is opened from the third side surface or the fourth side surface of the second heat transfer body, and at least one end of the third flow channel is opened from one of the third side surface or the fourth side surface of the first heat transfer body.

2. The heat treatment device according to claim 1, further comprising a gas supply part communicating with the one end of the third flow channel to supply purge gas to the third flow channel.

3. The heat treatment device according to claim 2, further comprising a gas detection sensor communicating with the other end of the third flow channel and capable of detecting the first fluid or the second fluid contained in the purge gas.

\* \* \* \* \*